United States Patent
Hiebert et al.

(10) Patent No.: US 11,310,276 B2
(45) Date of Patent: Apr. 19, 2022

(54) ADJUSTING RESILIENCY POLICIES FOR CLOUD SERVICES BASED ON A RESILIENCY SCORE

(71) Applicant: International Business Machines Corporation, Armonk, NY (US)

(72) Inventors: Daniel L. Hiebert, Montrose, CO (US); Sneha M. Varghese, Fishkil, NY (US); Raymond S. Perry, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 16/132,767

(22) Filed: Sep. 17, 2018

(65) Prior Publication Data

US 2020/0092334 A1    Mar. 19, 2020

(51) Int. Cl.
| | |
|---|---|
| G06F 9/455 | (2018.01) |
| H04L 41/0813 | (2022.01) |
| H04L 29/06 | (2006.01) |
| H04L 41/5009 | (2022.01) |
| G06F 11/34 | (2006.01) |
| H04L 41/0893 | (2022.01) |

(52) U.S. Cl.
CPC .......... *H04L 63/20* (2013.01); *G06F 9/45558* (2013.01); *G06F 11/3419* (2013.01); *H04L 41/0813* (2013.01); *H04L 41/0893* (2013.01); *H04L 41/5009* (2013.01); *H04L 63/1433* (2013.01)

(58) Field of Classification Search
CPC ............. G06F 11/1461; G06F 11/1484; G06F 11/3419; G06F 11/3055; G06F 11/3006; G06F 2009/45587; G06F 9/45558; G06F 8/60; H04L 41/0816; H04L 41/0893; H04L 43/16; H04L 43/0805; H04L 41/0813; H04L 41/5009; H04L 43/0888; H04L 63/20; H04L 63/1433
USPC ....................................................... 714/47.2
See application file for complete search history.

(56) References Cited

U.S. PATENT DOCUMENTS

| | | |
|---|---|---|
| 9,143,394 B2 | 9/2015 | Deng |
| 9,569,298 B2 | 2/2017 | Hampapur |
| 9,628,340 B2 | 4/2017 | Blair |

(Continued)

OTHER PUBLICATIONS

Ghosh et al. ,"Resiliency Quantification for Large Scale Systems: An IaaS Cloud Use Case", ValueTools 2016, Oct. 25-28, Taormina, Italy, EAI 978-1-63190-141-6, DOI 10.4108/cai.25-10-2016.2266805, 8 pages.

(Continued)

*Primary Examiner* — Frantz B Jean
(74) *Attorney, Agent, or Firm* — Andrew Aubert

(57) ABSTRACT

Evaluating a plurality of computers hosting a cloud platform for effectiveness at operating through operational failures with minimal or no degradation to operations by identifying vulnerabilities in hardware, firmware, software and operational policy/plan aspects of the plurality of computers and managing the identified vulnerabilities by modifying hardware, firmware, software, and operational policy/plan aspects of the plurality of computers and the hosted cloud platform to improve effectiveness at operating through operational failures with minimal or no degradation to operations.

19 Claims, 7 Drawing Sheets

(56) References Cited

U.S. PATENT DOCUMENTS

| | | | |
|---|---|---|---|
| 9,845,041 B1* | 12/2017 | Courtland | B62D 33/0273 |
| 9,990,265 B2* | 6/2018 | Bhide | G06F 9/5016 |
| 2011/0078510 A1 | 3/2011 | Beveridge | |
| 2012/0185913 A1* | 7/2012 | Martinez | H04L 12/66 |
| | | | 726/1 |
| 2014/0096139 A1 | 4/2014 | Alshinnawi | |
| 2014/0164166 A1 | 6/2014 | Akolkar | |
| 2015/0220357 A1 | 8/2015 | Huang | |
| 2015/0281015 A1 | 10/2015 | Griffith | |
| 2016/0034293 A1* | 2/2016 | Cao | G06F 9/5083 |
| | | | 718/1 |
| 2016/0239361 A1 | 8/2016 | Vlassarev | |
| 2016/0364255 A1* | 12/2016 | Chefalas | G06F 8/63 |
| 2017/0083374 A1 | 3/2017 | Yin | |
| 2017/0109183 A1* | 4/2017 | Cropper | G06F 1/3203 |
| 2017/0147417 A1* | 5/2017 | Sasturkar | G06F 11/3006 |
| 2017/0235507 A1* | 8/2017 | Sinha | H04L 67/1095 |
| | | | 711/114 |
| 2018/0275913 A1* | 9/2018 | Mitkar | G06F 11/1469 |
| 2018/0295036 A1* | 10/2018 | Krishnamurthy | G06F 11/3006 |
| 2018/0375886 A1* | 12/2018 | Kirti | H04L 63/104 |
| 2019/0068627 A1* | 2/2019 | Thampy | H04L 63/1416 |
| 2019/0095265 A1* | 3/2019 | Dome | H04L 41/147 |
| 2019/0199611 A1* | 6/2019 | Kotadia | H04L 41/046 |

OTHER PUBLICATIONS

Novak et al., "Towards Resilience Metrics for Future Cloud Applications", Proceedings of the 6th International Conference on Cloud Computing and Services Science, 2016, Publisher: Lancaster University, 6 pages.

* cited by examiner

ADJUSTING RESILIENCY POLICIES FOR CLOUD SERVICES BASED ON A RESILIENCY SCORE

BACKGROUND

The present invention relates generally to the field of provision of services in a services oriented architecture (SOA) for executing computer programs, more particularly to provision of services in an SOA that is implemented in a cloud environment, and even more particularly to helping ensure reliability, or resiliency, of services provided in an SOA.

A service oriented architecture (SOA) is a style of executing a computer program, or software design, where services are provided to the other components by application components through a communication protocol over a network (often the internet or a cloud network). Typical basic principles of SOA are independent of vendors, products and/or technologies. A service is a discrete unit of functionality that can be accessed remotely and acted upon and updated independently, such as retrieving a utility account statement online. A typical service has four properties: (i) it logically represents a business activity with a specified outcome; (ii) it is self-contained; (iii) it is a black box for its consumers; and (iv) it may consist of other underlying services. Different services can be used together to provide the functionality of a large computer program, or software application. SOA is typically less about how to modularize an application, and more about how to compose an application by integrating distributed, separately-maintained and deployed software components. SOA is typically enabled by technologies and standards that make it easier for components to communicate and cooperate over a network, especially an IP (internet protocol) network.

One application of SOA is cloud computing. A service provider can use and/or manage services located in a cloud. Cloud implementations of SOAs are typically different from more traditional SOAs because cloud implementations of SOAs allow for greater flexibility with where services are deployed.

High Availability (HA) policies are a known type of policies used in connection with hardware and software that provide services in the cloud and also in more traditional network environments. There are three types of HA policies (HAPs): (i) policies governing the activity level of monitoring of system activity and health by a managed service. (for example, inactive monitoring, low active monitoring, intermediate level active monitoring, high level active monitoring, where monitoring of activity/health is suspended in inactive monitoring, and the monitoring subsystem may be connected to the infrastructure, but it is not actively monitoring); (ii) server relocation policies that specify operating conditions that will cause servers to relocate from one server to another server in such a way as to increase availability of services served by the servers; and/or (iii) policies controlling the operating conditions that cause redundant setups to be added or subtracted from the system. HA requires storage, compute, and network resources to support moving a workload from one server to another server, but it does not necessarily need to move to another physical location.

High availability policies are defined by what they do in certain situations. As an example of an active monitoring type of HAP, the value of Active/Monitor are the actual values of the "High Availability policies." More specifically, in one known example of a HAP, an Active/Monitor parameter value of "Active" does the following: enables HA for instances, and monitors the state of the VM and automatically restarts the VM if it stops unexpectedly due to one of the following causes: node power outage, node network failure, and/or hypervisor failing for any reason. In this case the remedial action for the policy value "Active" is to "restart" in certain conditions, but note that the policy value is "Active" not "Restart." A typical usage of these values may be reflected in a configuration such as the following: <ha_policy>active</ha_policy>

A few examples of configuration settings relevant to the identity of the operative HAP are: (i) configure an instance's maintenance behavior and automatic restart setting using the onHostMaintenance and automaticRestart properties (all instances are configured with default values unless you explicitly specify otherwise); (ii) onHostMaintenance determines the behavior when a maintenance event occurs that might cause an instance to reboot; (iii) default migrate, which causes compute engine to live migrate an instance when there is a maintenance event; (iv) terminate, which terminates an instance instead of migrating it; (v) automaticRestart: Determines the behavior when an instance crashes or is terminated by the system; (vi) default true, so compute engine restarts an instance if the instance crashes or is terminated; (vii) default false, so compute engine does not restart an instance if the instance crashes or is terminated. From the above HA-related configuration settings, the operative HAP may be identified. In this example, there are four (4) availability policies: (i) HostMaintenance@migrate_AutomaticRestart@true; (ii) HostMaintenance@terminate_AutomaticRestart@true; (iii) HostMaintenance@migrate_AutomaticRestart@false; and (iv) HostMaintenance@terminate_AutomaticRestart@false.

Disaster Recovery (DR) policies are a known type of policies used in connection with hardware and software that provide services in the cloud and also in more traditional network environments. There are four (4) types of DR policies (DRPs): (i) policies governing operations of a site recovery manager application (that is, a centralized management utility used to manage virtual machines, multiple ESXi hosts, and all dependent components from a single centralized location); (ii) policies governing geo redundant storage, app, entire stack, etc. (for example, operating stack is configured in multiple geos to overcome disaster scenarios); (iii) policies governing scalable deployment (for example, deployment via virtual machines, containers and/or other virtualized computing environments) to ensure that applications keep running by scaling resources; (iii) policies governing active monitoring (for example, running stack is actively monitored); and (iv) policies governing automated provisioning (for example, the running stack reconstructed as service failures are detected). DR policies require an available location for workloads in another physical location. Storage, compute, and network resources to support moving a workload from one physical location to another must be available and healthy.

It is known to replace computer hardware used in an SOA when it gets old and/or less operationally effective.

"Physical drivers" are known. For purposes of this document, a physical driver is the software that enables physical hardware to interact with the Operating System.

In the field of networked computers that perform distributed computing, "resiliency" is the ability to provide and maintain an acceptable level of service in the face of faults and challenges to normal operation. Threats and challenges for services can range from simple misconfiguration to large scale natural disasters to targeted attacks. As such, the quality of resiliency can involve a very wide range of different computer operations and/or computing environment parameters. When attempting to increase resiliency of a networked computer system, the challenges, and their associated probabilities of various challenges, are identified and appropriate resilience metrics have to be defined for a "service" to be protected. Some types of services that are protected in accordance with resiliency metrics include: (i) services that support distributed processing; (ii) services that support network storage; (iii) services that maintain communication services (for example, video conferencing, instant messaging and online collaboration); and (iv) services that provide access to applications and data as needed). Note that "resiliency" and "survivability" are interchangeably used in this document.

Techniques are known in the prior art for identifying uptime for each of a plurality of components within a cluster of nodes, and determines a reliability level for each of the plurality of components, where the reliability level of each component is determined by comparing the identified uptime for the component with mean-time-between-failure data for components of the same component type.

SUMMARY

According to an aspect of the present invention, there is a method, computer program product and/or system that performs the following operations (not necessarily in the following order): (i) receiving a time-date data set including information indicative of the time and date at which certain computer operations were performed in a set of server computer(s); (ii) receiving a machine logic based rules data set including a plurality of machine logic based rules; (iii) determining a resiliency value of the set of server computer(s) based upon an application of the plurality of machine logic based rules to the time-date data set, with the resiliency value corresponding to an ability of the set of server computer(s) to handle operations when some of the hardware, firmware and/or software of at least some of the set of server computer(s) fails; (iv) determining a recommended change to the hardware, firmware and/or software of the set of server computers based, at least in part, upon the resiliency value; and (v) making the recommended change to the set of server computer(s).

According to an aspect of the present invention, there is a method, computer program product and/or system that performs the following operations (not necessarily in the following order): (i) receiving a time-date data set including information indicative of the time and date at which certain computer operations were performed in a set of server computer(s); (ii) receiving a machine logic based rules data set including a plurality of machine logic based rules; (iii) determining a resiliency value of the set of server computer(s) based upon an application of the plurality of machine logic based rules to the time-date data set, with the resiliency value corresponding to an ability of the set of server computer(s) to handle operations when some of the hardware, firmware and/or software of at least some of the set of server computer(s) fails; (iv) determining a recommended change to a disaster recovery plan for the set of server computer(s) based, at least in part, upon the resiliency value; and (v) making the recommended disaster recovery plan change to the set of server computer(s).

According to an aspect of the present invention, there is a method, computer program product and/or system that performs the following operations (not necessarily in the following order): (i) receiving a time-date data set including information indicative of the time and date at which certain computer operations were performed in a set of server computer(s); (ii) receiving a machine logic based rules data set including a plurality of machine logic based rules; (iii) determining a resiliency value of the set of server computer(s) based upon an application of the plurality of machine logic based rules to the time-date data set, with the resiliency value corresponding to an ability of the set of server computer(s) to handle operations when some of the hardware, firmware and/or software of at least some of the set of server computer(s) fails; (iv) determining a recommended change to a high availability policy (HAP) for the set of server computer(s) based, at least in part, upon the resiliency value; and (v) making the recommended HAP change to the set of server computer(s).

DETAILED DESCRIPTION

Figure 1A:
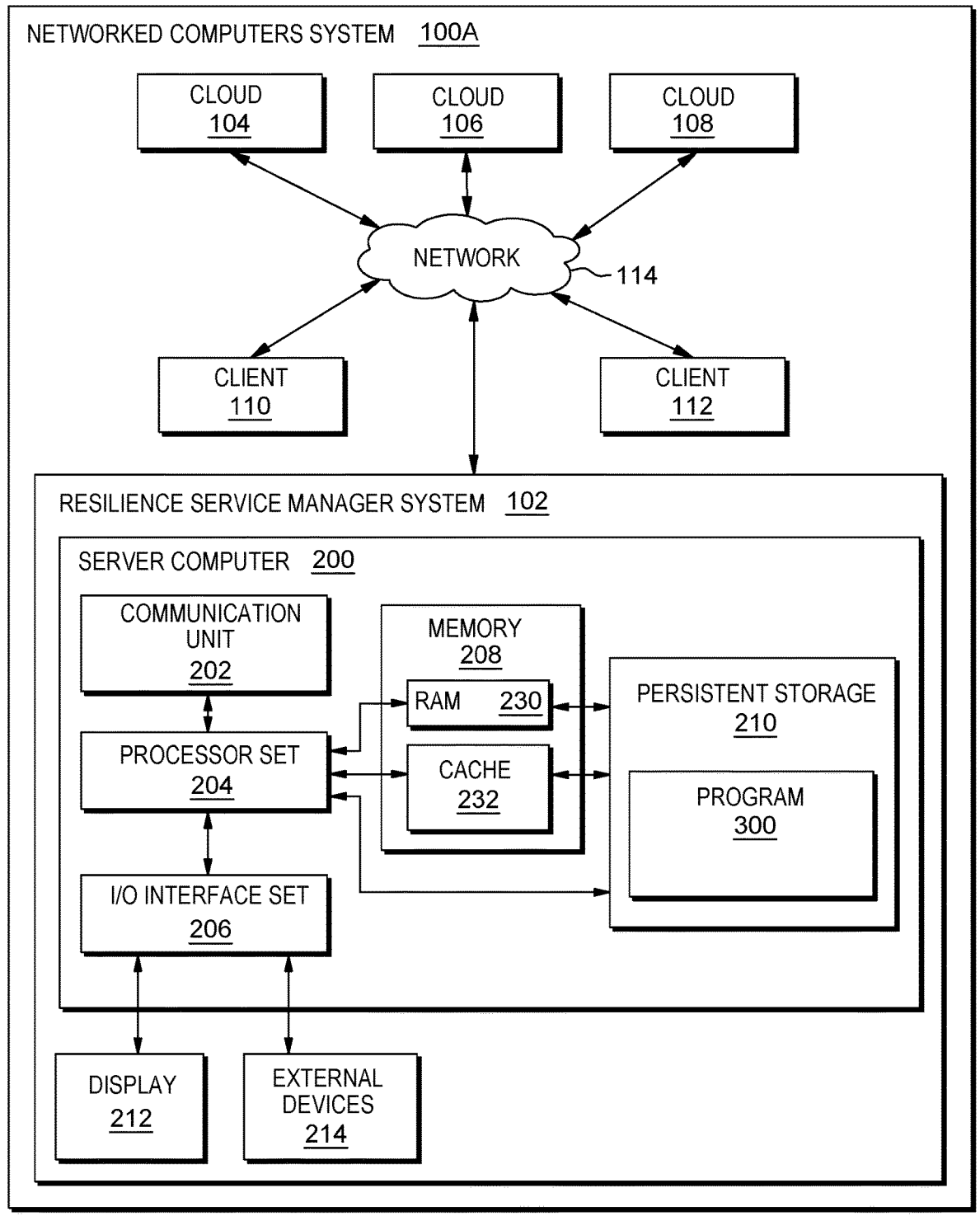
FIG. 1A is a block diagram view of a first embodiment of a system according to the present invention.

Some embodiments of the present invention use a resiliency score (reflecting determined resiliency of a computer system) to do one or more of the following things: (i) change the allocation of hardware, firmware and/or running software to the system (for example, add "mirror" sites or replicated data to the computer system on newly allocated server computers in response to a poor resiliency score); (ii) change the HAP of the computer system; and/or (iii) change the DRP of the computer system. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1A is a functional block diagram illustrating various portions of networked computers system 100A, including: resilience service manager sub-system 102; cloud sub-systems 104, 106, 108; client sub-systems 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Resilience service manager system 102 is, in many respects, representative of the various computer sub-system(s) in the present invention. Accordingly, several portions of resilience service manager system 102 will now be discussed in the following paragraphs.

Resilience service manager system 102 may be a laptop computer, tablet computer, netbook computer, personal computer (PC), a desktop computer, a personal digital assistant (PDA), a smart phone, or any programmable electronic device capable of communicating with the client and cloud sub-systems via network 114. Program 300 is a collection of machine readable instructions and/or data that is used to create, manage and control certain software functions that will be discussed in detail, below, in the Example Embodiment sub-section of this Detailed Description section.

Resilience service manager system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Resilience service manager system 102 is shown as a block diagram with many double arrows. These double arrows (no separate reference numerals) represent a communications fabric, which provides communications between various components of resilience service manager system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for resilience service manager system 102; and/or (ii) devices external to resilience service manager system 102 may be able to provide memory for resilience service manager system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to resilience service manager system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
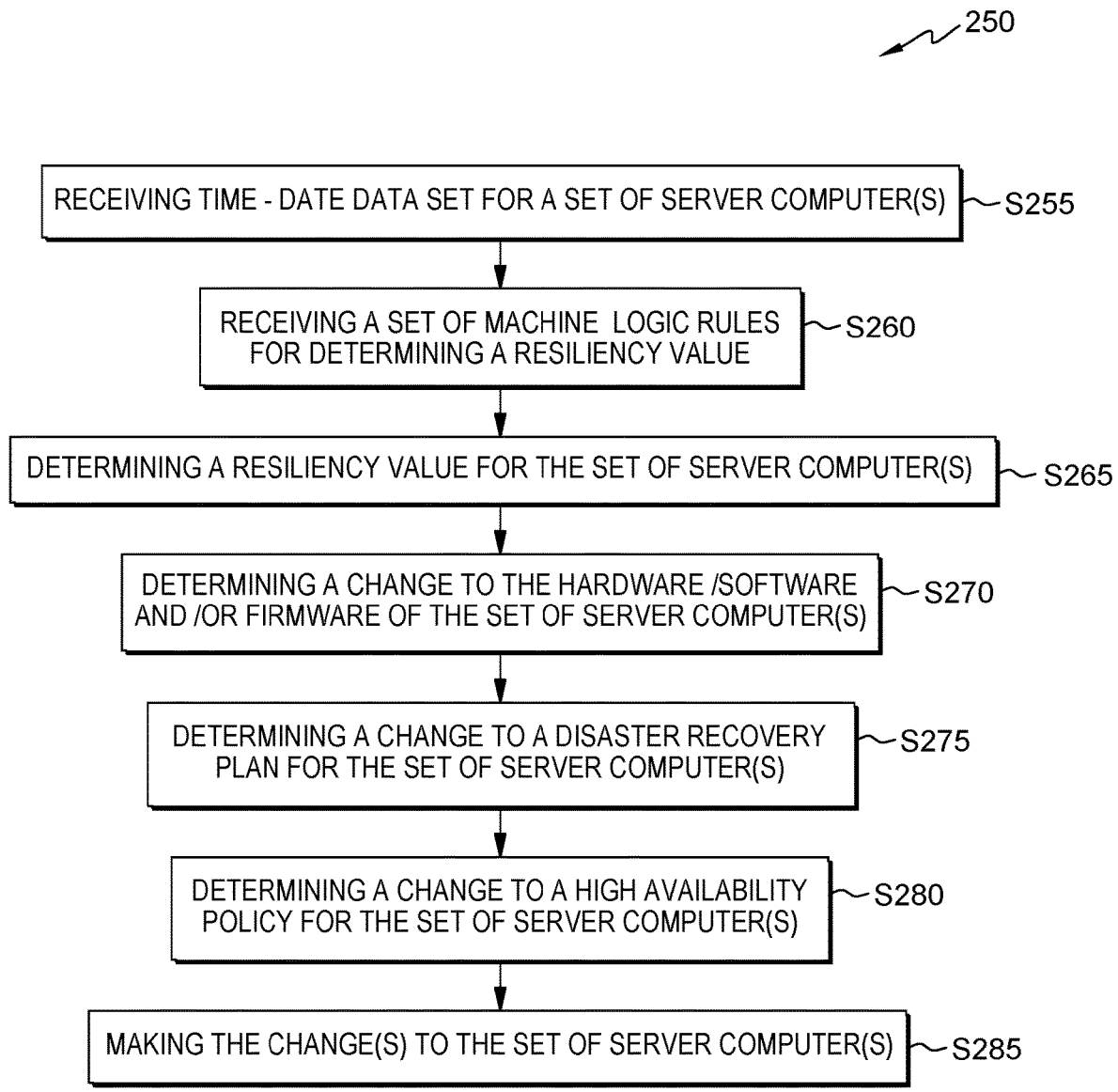
FIG. 2 is a flowchart showing a first embodiment method performed, at least in part, by the first embodiment system.
Figure 3:
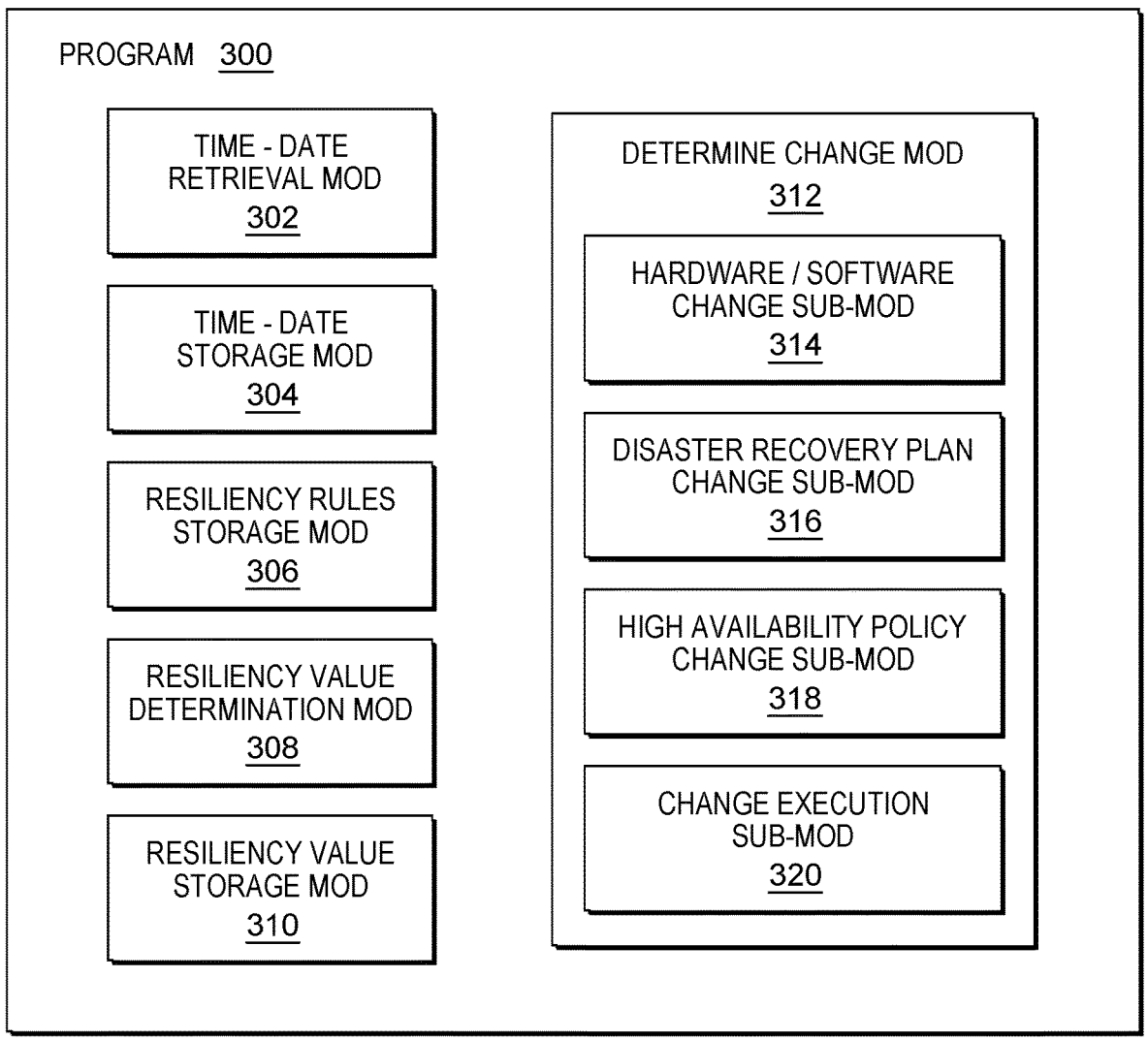
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where Time-Date retrieval module ("mod") 302 receives a time-date data set, including time and date information for a plurality of software, hardware and/or firmware components of server 114 (shown in FIG. 1B) of cloud 104 and stores the time-date data set in Time-Date storage mod 304. In this example embodiment, time and date information includes the following types of information: (i) time and date when a virtual machine, running on server 114, was instantiated from a virtual machine image; (ii) time and date when a hypervisor was installed on server 114; (iii) time and date when a basic input/output system (BIOS) was installed on server 114; (iv) time and date when an operating system was installed on server 114; (v) time and date when a firmware upgrade was made on server 114; and (vi) time and date when a physical driver for a CPU was installed on server 114.

In this example embodiment, the following time and date information is received regarding server 114: (i) the virtual machine image (shown as guest v/m 118 of FIG. 1B) was instantiated 3 months prior to S255; (ii) the hypervisor (not shown, part of app 116) was installed on server 114 13 months prior to S255; (iii) the BIOS (shown as BIOS 126) was installed on server 114 44 months prior to S255; (iv) an operating system (shown as O/S 124) was last updated 9 months prior to S255; (v) firmware for the network interface (not shown) of server 114 was last updated 12 months prior to S255; and (vi) physical drivers for the processor(s) set 128 of server 114 were installed 61 months prior to S255. In some alternative embodiments of the present invention, time and date information may include as few as one of the foregoing list of types of time and date information, or may include additional types of time and date information not listed in this paragraph.

Figure 1B:
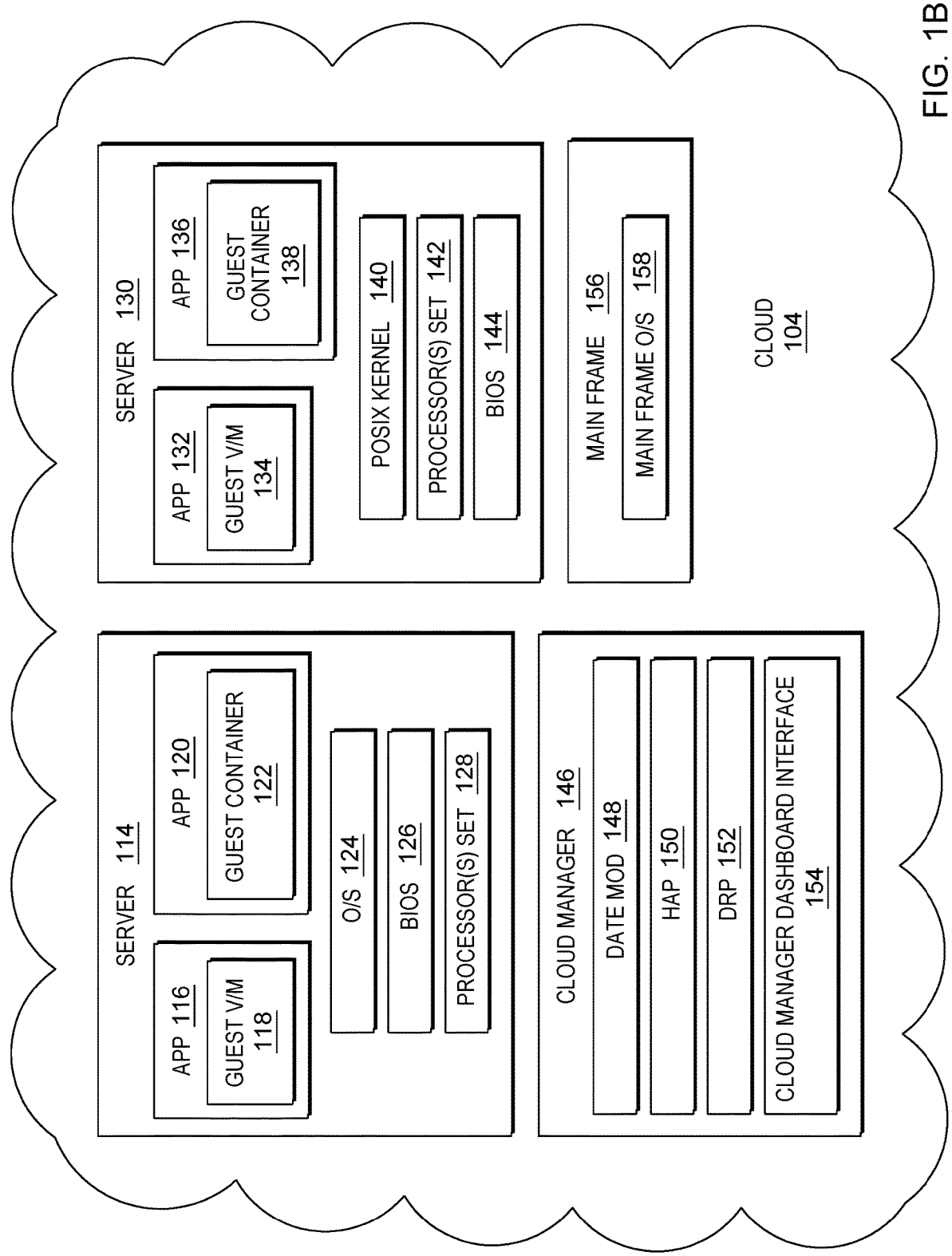
FIG. 1B is a block diagram view of a cloud environment according to the present invention.

As a more detailed walkthrough of this example embodiment, time-date retrieval module 302 of program 300 (shown in FIG. 3), which resides within program 300 on resilience service manager system 102 of FIG. 1A, receives a time-date data set from server 114 of cloud 104 of FIG. 1B. Cloud 104A in FIG. 1B processes this request through date mod 148 of cloud manager 146. This time-date data set includes: (i) a time and date when app 116 instantiated guest V/M 118; (ii) a time and date when app 116, which includes a hypervisor (not shown), was last installed and/or updated on server 114; (iii) a time and date BIOS 126 was last installed and/or updated on server 114; (iv) a time and date when O/S 124 was last installed and/or updated on server computer 114; (v) a time and date when firmware for the network interface of server 114 was last installed and/or updated on server 114; and (vi) a time and date when physical drivers for processor(s) set 128 was last installed/updated on server 114.

Additionally, the high availability policy and disaster recovery plan for server 114 is retrieved at this time. In this example embodiment, high availability policy specifically refers to a level of active monitoring for the health and status of server 114, with the following levels, with each subsequent level corresponding to a higher frequency interval for monitoring: (i) no active monitoring; (ii) low active monitoring; (iii) intermediate active monitoring; and (iv) high active monitoring. The high availability policy for server 114 is intermediate active monitoring. In this example embodiment, disaster recovery plans refers to a frequency of complete backups of all data stored on server 114 and a percentage of normal operations and/or throughput capability provided by a set of remote backup server computer(s). The disaster recovery plan for server 114 includes a complete backup on a weekly schedule and a set of remote backup server computer(s) with 95% capability of normal operations. Using FIG. 1B for reference, the time-date data set requested by resilience service manager system 102 of FIG. 1A includes the high availability policy of cloud 104A (and the underlying computer devices of cloud 104A, such as server 114 of FIG. 1B), stored in HAP 150 of cloud manager 146. Furthermore, the time-date data set requested by resilience service manager system 102 of FIG. 1A includes the disaster recovery plan of cloud 104A (and the underlying computer devices of cloud 104A, such as server 114 of FIG. 1B), stored in DRP 152 of cloud manager 146. The high availability policy and disaster recovery plan for the computer devices of cloud 104A are stored in HAP 150 and DRP 152 of cloud manager 146, respectively.

In an alternative embodiment of the present invention, the request from time-date retrieval mod 302 of program 300 concerns containers instead of the virtual machines discussed previously. In this alternative embodiment, time-date retrieval module 302 of program 300 (shown in FIG. 3), which resides within program 300 on resilience service manager system 102 of FIG. 1A, receives a time-date data set from server 114 of cloud 104A of FIG. 1B. Cloud 104A in FIG. 1B processes this request through date mod 148 of cloud manager 146. This time-date data set includes: (i) a time and date when app 120 instantiated guest container 122; (ii) a time and date when app 116, which includes a docker engine (not shown), was last installed and/or updated on server 114; (iii) a time and date BIOS 126 was last installed and/or updated on server 114; (iv) a time and date when O/S 124 was last installed and/or updated on server computer 114; (v) a time and date when firmware for the network interface of server 114 was last installed and/or updated on server 114; and (vi) a time and date when physical drivers for processor(s) set 128 was last installed/updated on server 114.

In yet another alternative embodiment of the present invention, the request from time-date retrieval mod 302 of program 300 concerns a different server computer of cloud 104A, server 130. Server 130, like server 114, has both a guest V/M (guest V/M 134) instantiated by an application (app 132) and a guest container (guest container 138) instantiated by an application (app 136), but differs in that in place of the operating system of server 114, server 130 has POSIX kernel 140. In this alternative embodiment, time-date retrieval module 302 of program 300 (shown in FIG. 3), which resides within program 300 on resilience service manager system 102 of FIG. 1A, receives a time-date data set from server 130 of cloud 104A of FIG. 1B. Cloud 104A in FIG. 1B processes this request through date mod 148 of cloud manager 146. This time-date data set includes: (i) a time and date when app 132 instantiated virtual machine 134; (ii) a time and date when app 132, which includes a hypervisor (not shown), was last installed and/or updated on server 130; (iii) a time and date when guest container 138 was instantiated on server 130 by app 136; (iv) a time and date when app 120, which includes a docker manager (not shown), was last installed and/or updated on server 130; (v) a time and date BIOS 144 was last installed and/or updated on server 130; (vi) a time and date when POSIX kernel 140 was last installed and/or updated on server computer 130; (vii) a time and date when firmware for the network interface of server 130 was last installed and/or updated on server 130; and (viii) a time and date when physical drivers for processor(s) set 142 was last installed/updated on server 130.

In another alternative embodiment of the present invention, the server computer, such as server 114 or server 130, is instead a mainframe computer, such as mainframe 156 of FIG. 1B. Mainframe 156 includes a mainframe operating system, such as mainframe O/S 158, as well as other components similar to server 114 or server 130, such as a processor(s) set (not shown), applications (not shown), virtual machine instantiations (not shown), container instantiations (not shown), BIOS (not shown), and POSIX kernel (not shown).

Processing proceeds to operation S260, where resiliency rules storage mod 306 receives a set of machine logic rules for determining a resiliency value for server 114. In this example embodiment, the machine logic rules are used to determine a resiliency value for server 114 by assigning values to a plurality of software, firmware and/or hardware components of server 114 and summing those values for a resulting resiliency value. For this example embodiment, the following machine logic rules are received: (i) time and date information indicating that a component has an age of a year or less results in a positive value of 10 for that component; (ii) time and date information indicating that a component has an age greater than a year but no more than three years results in a value of 0 for that component; (iii) time and date information indicating that a component has an age greater than three years no more than five years results in a value of negative 10 for that component; and (iv) time and date information indicating that a component has an age greater than five years results in a value of negative 20 for that component.

Additional machine logic rules determine values for high availability policies and disaster recovery plans. In this example embodiment, high availability policy specifically refers to a level of active monitoring for the health and status of server 114, with the following levels, with each subsequent level corresponding to a higher frequency interval for monitoring: (i) no active monitoring; (ii) low active monitoring; (iii) intermediate active monitoring; and (iv) high active monitoring. Each of these levels of active monitoring have a corresponding value for the resiliency value determination, including the following: (i) no monitoring has a corresponding value of negative 40; (ii) low active monitoring has a corresponding value of positive 10; (iii) intermediate active monitoring has a corresponding value of positive 20; and (iv) high active monitoring has a corresponding value of positive 30. In some alternative embodiments, other forms of active monitoring and high availability policies with different thresholds and values are used to assign values for a resiliency value determination. In further alternative embodiments, weights are assigned to the components of the resiliency value determination such that some components such as the high availability policy have a greater impact on the resiliency value determination.

In this example embodiment, disaster recovery plans refers to a frequency of complete backups of all data stored of server 114 and a percentage of normal operations and/or throughput capability of server 114 provided by a set of remote backup server computer(s). In this example embodiment, machine logic rules for assigning a value corresponding to the disaster recovery plan of server 114 for determining the resiliency value of server 114 includes the following: (i) a backup frequency of 24 hours or less has a corresponding value of positive 20; (ii) a backup frequency of more than 24 hours but less than one week has a corresponding value of 0; (iii) a backup frequency of greater than one week but less than one month has a corresponding value of negative 10; (iv) a backup frequency of greater than one month has a corresponding value of negative 40; (v) a percentage of normal operation capability of 90% or more has a corresponding value of positive 20; (vi) a percentage of normal operation capability of less than 90% but greater than or equal to 75% has a corresponding value of positive 10; (vii) a percentage of normal operation capability of less than 75% but greater than or equal to 50% has a corresponding value of 0; and (viii) a percentage of normal operation capability of less than 50% has a corresponding value of negative 30. In some alternative embodiments, other forms of disaster recovery plans with different thresholds and values are used to assign values for a resiliency value determination. In further alternative embodiments, weights are assigned to the components of the resiliency value determination such that some components such as the disaster recovery plan have a greater impact on the resiliency value determination.

In some alternative embodiments of the present invention, different machine logic rules may be received, or different values or age thresholds may be used in similar rules to those in the above list. In some further alternative embodiments of the present invention, weights are assigned to the value each of the different components, enabling individual components to provide a greater influence on the overall resiliency value of server 114 or other server computers.

Processing proceeds to operation S265, where resiliency value determination mod 308 determines a resiliency value for server 114 of cloud 104A. In this example embodiment, each of the types of data of the time-date data set for server 114 stored in time-date storage mod 304 is assigned a value based on the machine logic rules stored in resiliency rules storage mod 306. In this example embodiment, the resiliency value of server 114 is the sum of the values for the components of server 114 including the high availability policy and the disaster recovery plan. Using the time-date data set received at S255 and the machine logic rules from S260, the following values are assigned to the components of server 114: (i) the virtual machine instantiation has a value of positive 10; (ii) the hypervisor has a value of 0; (iii) the BIOS has a value of negative 10; (iv) the operating system has a value of positive 10; (v) firmware for the network interface (not shown) of server 114 has a value of 0; (vi) physical drivers for processor(s) set 128 of server 114 has a value of negative 20; (vii) high availability policy of server 114 (shown as HAP 150 of cloud manager 146) has a value of positive 20; and (viii) disaster recovery plan of server 114 (shown as DRP 152 of cloud manager 146) has a value of positive 20. The total sum of these values results in a resiliency value for server 114 of positive 30. Determined resiliency values are stored in resiliency value storage mod 310 of program 300.

Some "resiliency values" according to the present invention may include and/or be used in conjunction with one, or more, of the following features, operations or characteristics: (i) relate to more than just network services; (ii) relate, at least partially, to operation of VMs, (iii) relate, at least partially, to operation of computer device hardware and/or storage hardware, (iv) resiliency scores are aggregated, (v) actions are taken based on resiliency scores, and/or (vi) the resiliency score is determined in a manner so that the resiliency score can be used to compare across multiple cloud providers.

Processing proceeds to operation S270, where hardware/software change sub-mod 314 of determine change mod 312 determines a change to the hardware, software and/or firmware of server 114. Based on the resiliency value of server 114, a change to the hardware of server 114 is determined, with the change including replacing processor(s) set 128 of server 114. In alternative embodiments of the present invention which include other changes to the software, hardware and/or firmware of server 114, including replacing and/or supplementing with redundant components for: (i) network communication components, (ii) input/output interface components, (iii) memory components, (iv) storage components, (v) operating systems, (vi) BIOS, (vii) physical drivers for the above listed components, and (viii) and any other such software, hardware and/or firmware components of typical server computers.

Processing proceeds to operation S275, where disaster recovery plan change sub-mod 316 of determine change mod 312 determines a change to the disaster recovery plan of the server computer, shown as DRP 152 of cloud manager 146. Based on the resiliency value determined at S265, a change to the disaster recovery plan is determined, with the change including increasing the frequency of complete backups to at least once per day. In alternative embodiments of the present invention, other changes to disaster recovery plans include: (i) increasing the number of remote geos where remote backup server computer(s) are located; and (ii) increasing the percentage of normal operations capability of the remote backup server computer(s).

Processing proceeds to operation S280, where high availability policy change sub-mod 318 of determine change mod 312 determines a change to the high availability policy of server 114, shown as HAP 150 of cloud manager 146. Based on the resiliency value determined at S265, a change to the high availability plan is determined, with the change including increasing the active monitoring from intermediate active monitoring to high active monitoring. In alternative embodiments of the present invention, other changes are made to the high availability policy of server 114 include: (i) increasing the redundancy of hardware components; and (ii) increasing the throughput capability of server 114 such that a partial loss of throughput capability has minimal or no impact on the required throughput for normal operations.

Figure 4:
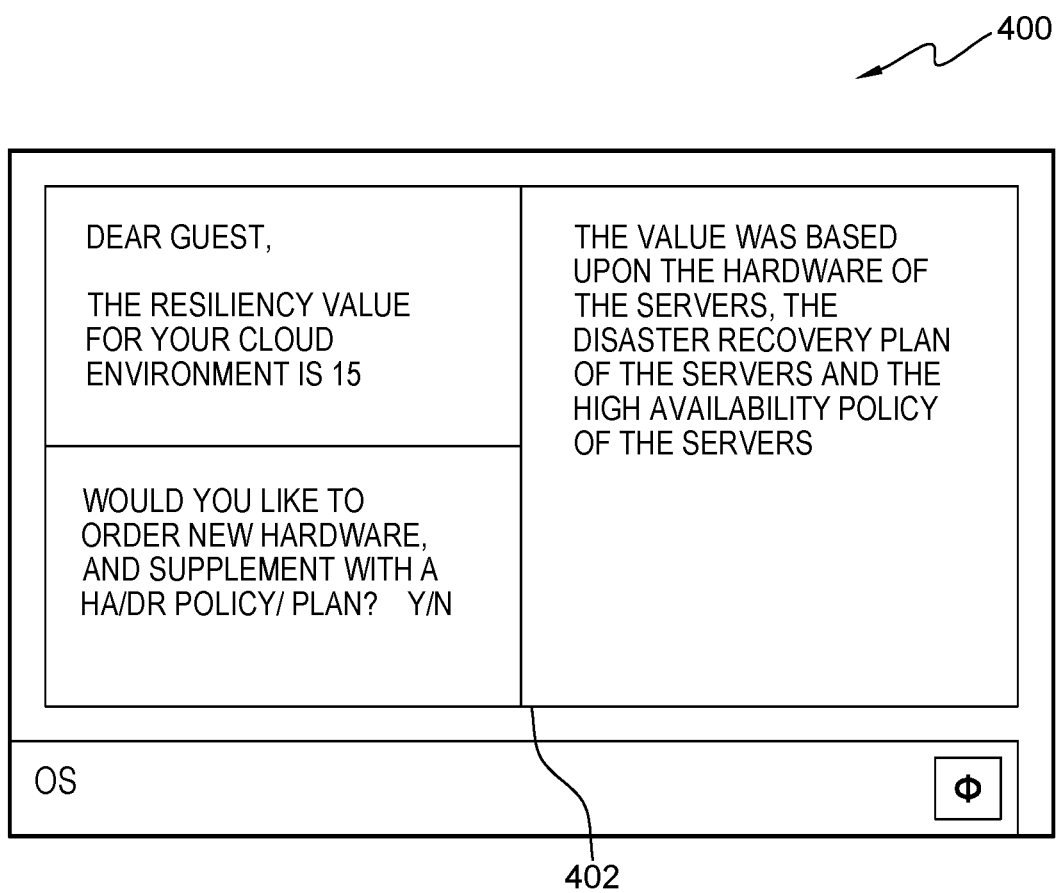
FIG. 4 is a screenshot view generated by the first embodiment system.

Processing proceeds to operation S285, where change execution sub-mod 320 of determine change mod 312 executes the changes determined at S270, S275 and S280 to the server computer. In this example embodiment, screen 402 of interface 400 of FIG. 4 is displayed by cloud management dashboard interface 154 of FIG. 1B, informing a guest that the resiliency score for their cloud environment is 15, explaining in general terms how the score was calculated, recommending new hardware as well as supplementing their cloud environment with a HA/DR policy/plan, and providing a yes or no prompt to respond. As a result of the guest selecting Y (for yes), a new processor(s) set is requested and installed to replace processor(s) set 128, the frequency of complete backups in increased to at least once every 24 hours in DRP 152, and the active monitoring has been increased to high active monitoring in HAP 150. Changes to the high availability policy and disaster recovery plan, HAP 150 and DRP 152, respectively, are made through cloud manager dashboard interface 154. In some alternative embodiments of the present invention, change execution sub-mob 320 changes the high availability policy and disaster recovery plan through the cloud manager dashboard interface without substantial human participation.

III. Further Comments and/or Embodiments

Some embodiments of the present invention recognize the following facts, potential problems and/or potential areas for improvement with respect to the current state of the art: (i) the idea of cloud managed services, or the management of the virtualized endpoints, is emerging in the public, private, and hybrid cloud markets as a way to ensure that virtualized workloads meet certain operating standards; (ii) cloud managed services brings the idea of setting up services such as Anti-Virus, Backup, Disaster Recovery, Monitoring, Health-Check, Patching, and Security to virtualized endpoints to ensure their stability, security, and performance; (iii) when cloud managed services are applied generically it can create a whole new set of problems in the cloud; (iv) one potential problem is ensuring that correct policies are adhered to in large cloud environments when each managed service is working in isolation within a large cloud environment (for example, some clouds may have as many as 18,000 virtual machines (VMs) running across several sites, perhaps 3,000 to 6,000 VMs per site); (v) some of these policies relate to the age of the hardware (sometimes herein referred to as the "wear date"); (vi) wear date information can be gleamed and from the physical host, for the overall age, or determined for individual components or derived; (vii) as the hardware ages over time, the probability of failure increases for these individual VMs running on these physical hosts; (viii) there exists a need to provide enhanced cloud managed services based on wear date information; (ix) Hardware as a Service (HaaS) is concept as it is applied to Managed Services, but HaaS does not typically address specific ways to ensure resiliency as hardware ages; (x) Resiliency Resolution in data center typically includes aspects such as references redundancy, Disaster Recovery (DR) and High Availability (HA); (xi) Resiliency Resolution is typically a huge monetary expense and is not always feasible for customers having limited budgets; and/or (xii) Business Resiliency typically includes four pragmatic approaches directed toward becoming more resilient with respect to the objective of preventing business disruption.

Some embodiments of the present invention may include one, or more, of the following features, characteristics and/or advantages: (i) gathering the information on the physical host hardware age directly, or indirectly, from one, or more, of the following: (a) firmware install dates of firmware running on hardware used in providing cloud managed services, (b) hypervisors install dates of hypervisors used in providing cloud managed services, and/or (c) operating system install dates of operating systems used in providing cloud managed services; (ii) physical host hardware age information is fed into an algorithm which generates a general resilience scoring; (iii) this scoring can also factor in other non-hardware date characteristics like HA or DR scoring; and/or (iv) using this resiliency scoring to provide a probability of failure and thereby provide a threshold of amendments or changes to frequency or scale of managed services.

An example algorithm for resilience service manager and resilience site services according to one embodiment of the present invention may include one, or more, of the following features, characteristics and/or advantages: (i) resilience gather scoring data for hardware and virtual machines: (a) gather input from firmware/bios, (b) hyper-visor install date, (c) gather physical driver software data, (d) gather hardware data (for example, power supply, disk drives, memory, network, CPU), (e) gather hardware failure events (disruptive events should trigger an immediate re-scoring), (f) communicate with cloud manager to retrieve HA and DR policy for individual VMs if available, and/or (g) associate this scoring on physical host and each Virtual Machine; and/or (ii) threshold policy actions based on overall scoring (for example, on a 1 to 100 scale with 1 being the least resilient and 100 being the most resilient): (a) a score of less than 10 would generate a hardware service request recommending flagging the physical host in a maintenance status to prevent new VMs and begin migrating VMs and replacing the physical host hardware, (b) a score of 10 to 40 would lead to an increase in backup frequency, (c) a score of 40 to 60 would: (1) increase health check frequency to monitor changes closely and trigger patching for validation of currency for driver updates, and (2) increase anti-virus scan frequency, (d) a score of 60 to 80 would increase validating scoring algorithm, and (e) a score above 80 would result in scheduled monitoring.

Some embodiments of the present invention may include one, or more, of the following features, characteristics and/or advantages: (i) included are two components, the Resilience Service Manager (RSM) and the Resilience Site Service Monitor (RSSM); (ii) the Resilience Service Manager requests regular coordinated "data gathering" exercises on the physical hosts; (iii) that request is relayed to various Resilience Site Service Monitors; (iv) the Resilience Service Manager, contains an algorithm to score the basic resilience on each physical host and its respective VM's; (v) it also has a threshold policy monitor that influences the broader policies of the CMS Service Providers (for example: Backup, Monitor, Patch, and Anti-Virus); (vi) the Resilience Service Manager can increase the frequency in which the data gathering is exercised against a specific host; (vii) the Resilience Service Manager, idea can be extended or improved by additionally do a grouping mechanism to put multiple VMs in a designated category and thereby taking group based actions across multiple VMs; (viii) one objective of the Resilience Site Service Monitor is to do data gathering at particular sites; (ix) the RSSM will talk the cloud provider (for example: vCenter, OpenStack, PowerVC) to retrieve characteristics about the physical hosts in the private cloud; (x) the RSSM can retrieve data from other sources if necessary; (xi) one reason that the RSSM is designed this way is for scalability, because there could be 3000 to 6000 VM's on dozens of blades, chassis, etc. at each site; (xii) information can be relayed back to central after periodic data is gathered; (xiii) the RSSM can drive parallel efficiencies by pushing data gathering exercises to multiple sites in parallel; (xiv) another feature enabled by some embodiments of the disclosed invention includes Historical Predictive Based Analytics; (xv) assuming homogenous hardware components across sites and within sites, a historical trends and predictive analytics can be triggered for anticipated alerts and additionally send them to the Guest OS; and/or (xvi) both computers hosting a cloud platform and client workloads running on a cloud platform may run instances of the Guest OS.

Figure 5:
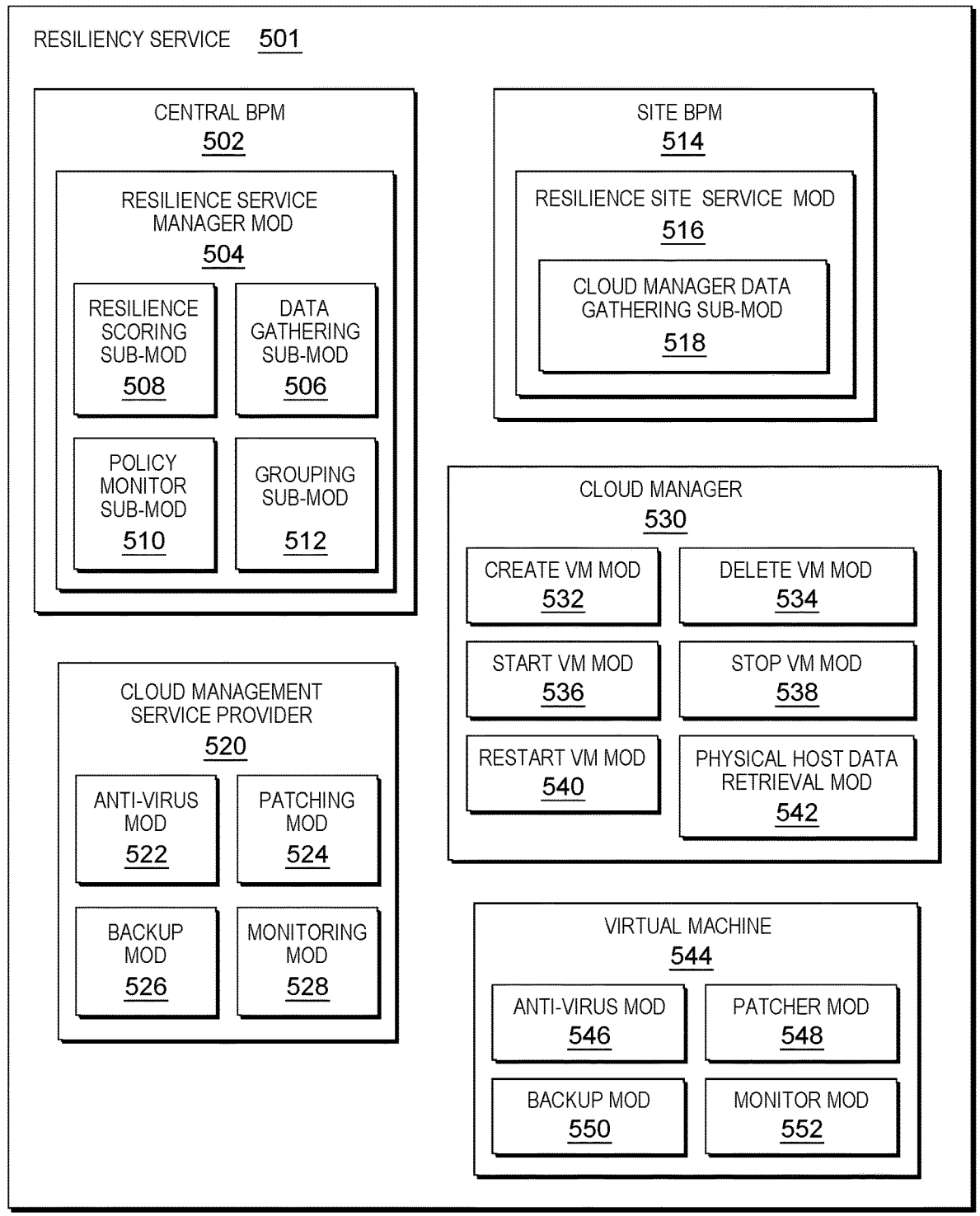
FIG. 5 is a block diagram of a second embodiment of a system according to the present invention.

FIG. 5 illustrates a block diagram of a machine logic portion 500 of a resiliency service according to some embodiments of the present invention. Resiliency Service 501 includes Central Business Process Manager (BPM) 502, Site BPM 514, Cloud Management Service Provider 520, Cloud Manager 530, and Virtual Machine 544. Central BPM 502 is stored on a computer readable storage media connected to a central business process manager computer device, located at a central location. Central BPM 502 includes a Resilience Service Manager Mod 504, which includes Data Gathering Sub-Mob 506, Resilience Scoring Sub-Mod 508, Policy Monitor Sub-Mod 510, and Grouping Sub-Mod 512. Data Gathering Sub-Mod sends a request to Site BPM 514 to requesting information indicative of characteristics of one or more physical host computer devices hosting a sub-set of virtual machines. Resilience Scoring Sub-Mod 508 determines a resilience score for a physical host using information requested by Data Gathering Sub-Mod 506. Policy Monitor Sub-Mod 510 modifies policies of Cloud Management Service Provider 520 and can adjust the frequency of Data Gathering Sub-Mod 506.

Site BPM 514 of FIG. 5 includes a Resilience Site Service Mod 516, which includes Cloud Manager Data Gathering Sub-Mod 518. Cloud Manager Data Gathering 518 queries Cloud Manager 530 for information regarding specific physical hosts hosting specific virtual machines, and then returns this information to Central BPM 502. Cloud Management Service Provider 520 includes Anti-Virus Mod 522, Patching Mod 524, Backup Mod 526 and Monitoring Mod 528. Anti-Virus Mod 522 installs and periodically updates malware protection software for virtual machines, such as Anti-Virus Mod 546 of Virtual Machine 544. Patching Mod 524 identifies appropriate software updates for software on a virtual machine and forwards them to patching software on the virtual machine, such as Patcher Mod 548 of Virtual Machine 544. Backup Mod 526 provides backup services to virtual machines by installing software such as Backup Mod 550 on a virtual machine such as Virtual Machine 544 to forward data from the virtual machine to Cloud Management Service Provider 520, which receives the data from the virtual machine and stores that data on another computer device, providing that data to a requesting entity later in the event of a failure to the virtual machine or its' underlying hardware. Monitoring Mod 528 installs monitoring software such as Monitor Mod 552 on a virtual machine such as Virtual Machine 544 and monitors data received from the monitoring software.

Cloud Manager 530 of FIG. 5 includes machine logic for managing one or more virtual machines across one or more physical hosts, including a Create VM Mod 532 that identifies a physical host and creates an instantiation of a virtual machine on that host. Delete VM Mod 534 deletes an instantiation of a virtual machine from a host. Start VM Mod 536 begins and/or resumes the operation of an inactive instantiation of a virtual machine created by Create VM Mod 532. Stop VM Mod 538 deactivates an instantiation of a virtual machine created by Create VM Mod 532. Restart VM Mod 540 momentarily deactivates an instantiation of a virtual machine created by Create VM Mod 532 before reactivating the instantiation. Physical Host Data Retrieval Mod 542 retrieves data about the physical host of an instantiation of a virtual machine created by Create VM Mod 532.

Figure 6:
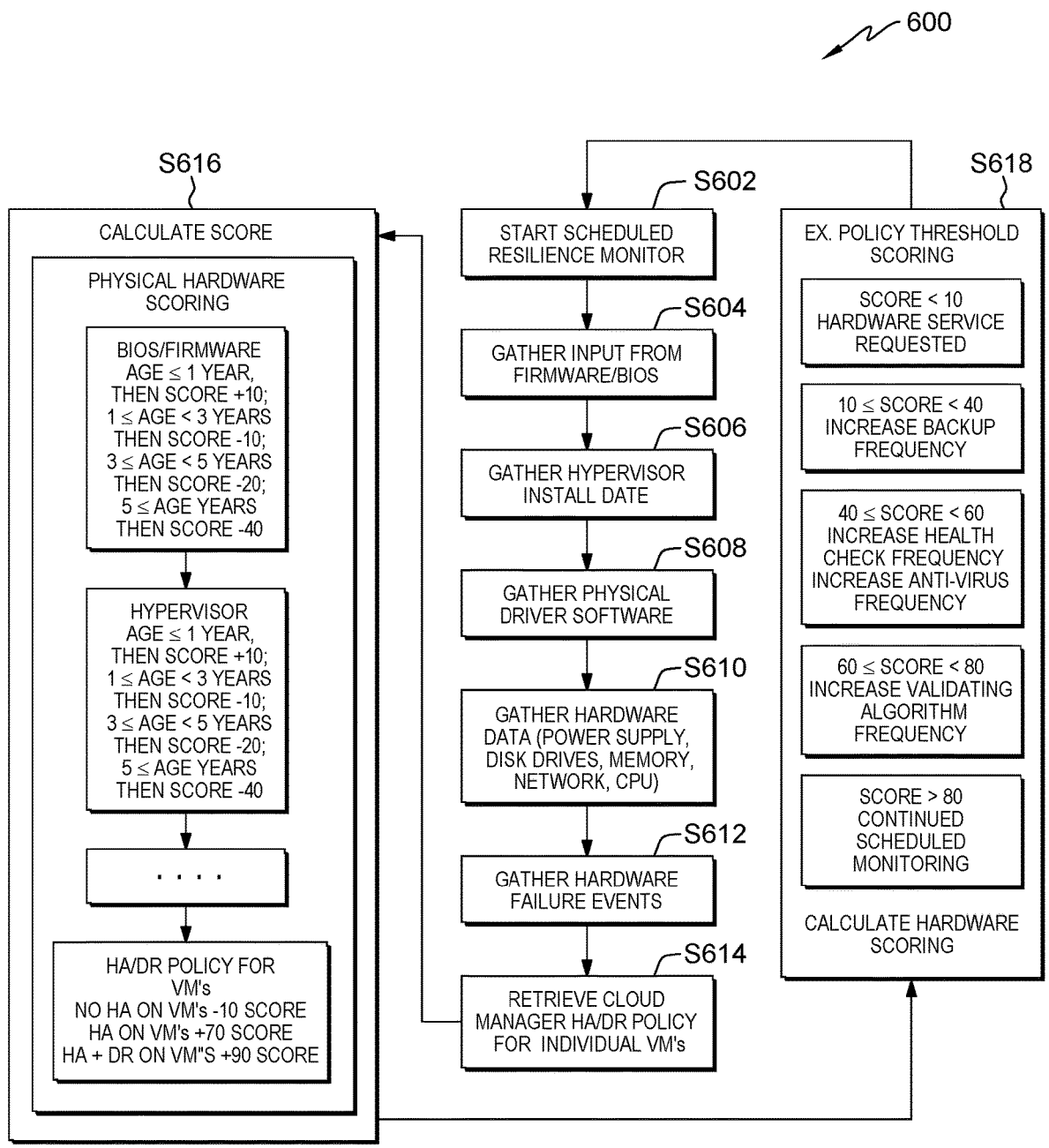
FIG. 6 is a flowchart diagram of a second embodiment of a method according to the present invention.

FIG. 6 illustrates flowchart 600 depicting a method according to one embodiment of the present invention for calculating a resiliency score for an instantiation of a virtual machine (VM) and resulting actions based upon the resiliency score.

At step S602, a resiliency service initiates scheduled resilience monitoring of an instantiation of a virtual machine.

At step S604, the resiliency service gathers information regarding the Bios and Firmware of the underlying computer device hosting the instantiation of the virtual machine. In some embodiments of the present invention, this information can include information indicative of what version of the Bios/Firmware is installed, the install date of the currently installed version of the Bios/Firmware, and other information indicative of how current the Bios/Firmware is.

At step S606, the resiliency service gathers information regarding a hypervisor for the instantiation of the virtual machine, including information indicative of what date the currently installed hypervisor was installed.

At step S608, the resiliency service gathers information regarding the physical driver software, including information indicative of which physical drivers are installed and what date those physical drivers were installed on the underlying computer device hosting the instantiation of the virtual machine.

At step S610, the resiliency service gathers hardware data information, including information indicative of which hardware components are installed on the underlying computer device hosting the instantiation of the virtual machine. Some examples of hardware components included in the hardware data includes one or more of the following: (i) the power supply for the computer device; (ii) disk drives for the computer device; (iii) memory components for the computer device; (iv) network interface components for the computer device; (v) central processing unit(s) (CPUs) for the computer device; (vi) other types of computer readable storage media; (vii) auxiliary components (for example, a RAID controller); and (viii) a motherboard component for the computer device.

At step S612, the resiliency service gathers hardware failure events data for hardware components of the computer device hosting the instantiation of the virtual machine. Some examples of hardware failure events data include: (i) information indicative of computing errors sourced to a hardware component; (ii) operational stoppages; (iii) malware infections; and (iv) service ticket information.

At step S614, the resiliency service retrieves from the Cloud Manager the HA/DR policy for the instantiation of the virtual machine. In some embodiments of the present invention, the absence of a High Availability or Disaster Recovery policy is not considered a High Availability or Disaster Recovery policy. For example, if there is no Disaster Recovery policy for the instantiation of the virtual machine, then that would not be considered a Disaster Recovery policy for the purpose of this embodiment of the present invention.

At step S616, a resiliency score is calculated for the instantiation of the VM. An example calculation is as follows: (i) for the firmware/Bios of an instantiation of a VM, if the firmware/Bios is less than 1 years old, add 10 to the resiliency score, subtract 10 from the score if the age of the firmware/Bios on the instantiation of the VM is between 1 and 3 years old, subtract 20 from the score if it is between 3 and 5 years old, and subtract 40 from the score if it is greater than 5 years old; (ii) for the hypervisor age, if the hypervisor installed on the instantiation of the VM is less than 1 years old, add 10 to the resiliency score, subtract 10 from the score if the age of the hypervisor is between 1 and 3 years old, subtract 20 from the score if it is between 3 and 5 years old, and subtract 40 from the score if it is greater than 5 years old; (iii) for the HA/DR policy set for the instantiation of the VM, if there is no high availability policy, subtract 10 from the score, if there is a high availability policy, add 70 to the score, and if there is both a high availability policy and a disaster recovery policy, add 90 to the score.

Lastly, at step S618, an action is determined in response to the resiliency score of the instantiation of the virtual machine. If the score is less than 10, generate a hardware service request for the physical host of the instantiation of the VM. If the score is between 10 and 40, increase the frequency that the instantiation of the VM executes backup functionality. If the score is between 40 and 60, increase health check frequency for the physical host of the instantiation of the VM and increase Anti-Virus scanning and/or updating frequency. If the score is between 60 and 80, increase the frequency of resiliency monitoring. If the score is greater than 80, then continue with regularly scheduled monitoring. Following this step is a return to step S602.

Some embodiments of the present invention may include one, or more, of the following features, characteristics and/or advantages: (i) gathering and analyzing various data points in a cloud environment to compute a resiliency score; (ii) taking action (for example, increase managed services like patching, monitoring etc. to recommend ordering new hardware) based on that score for improving resiliency on the cloud; (iii) a Resiliency Service Manager at a central location and a Resilience Site Service on each of the sites that work together to achieve the improved resiliency; (iv) the Resilience Service Manager is to trigger regular coordinated data gathering exercises on the physical hosts; (v) that request is relayed to various Resilience Site Services; (vi) the site services objective is to do data gathering at particular sites to retrieve characteristics about the physical hosts in the cloud; (vii) the Resilience Service Manager can drive parallel efficiencies by pushing data gathering to multiple sites in parallel; (viii) consideration of High Availability policy when deciding (by machine logic) when to replace computer hardware components (like relatively old server computers); and/or (ix) consideration of Disaster Recovery policy when deciding (by machine logic) when to replace computer hardware components (like relatively old server computers).

Some embodiments of the present invention may include one, or more, of the following features, characteristics and/or advantages: (i) gather and analyze the various data points in a cloud environment to compute a resiliency score and takes actions (for example, increase managed services like patching, monitoring etc. to recommend to order new hardware) based on that score for improving resiliency on the cloud; (ii) references to resiliency mean the ability to withstand/overcome failures; (iii) creating a score for resiliency and based on the score suggesting remediation measures; (iv) generate a resiliency score; (v) handle factors like HA/DR (high availability/disaster recovery) policies that are relevant to the resiliency posture of the environment being analyzed; (vi) factor in any redundancy in the setup (for HA/DR) which would improve the resiliency score; (vii) For example there could be HA policies set to active/monitor etc.; (viii) if there an active HA policy then servers could be restarted automatically when failure happens; (ix) if the policy is set to monitor, then there will be active monitoring going on, which will notify the system admins when a failure happens; (x) this helps with the resiliency posture of the environment and yields a better resiliency score; (xi) Also if there are DR policies like Active/Active or Active/Passive configured, it gives a better resiliency score and hence a better capacity to withstand potential failures/disasters; (xii) consider the virtual servers running on the physical hosts; (xiii) for example, even if the physical host is quite aged, if the virtual server running on it has an equivalent active/passive counterpart to it, which can be used during a failure, it improves the resiliency score; (xiv) using managed services like monitoring, backup etc. as actions from the failure analysis it does; (xv) based on the resiliency score generated there are rules that can be set on the next course of action; (xvi) replacing hardware proactively based on the failure analysis through resiliency score based actions; and/or (xvii) the virtual server is better prepared to handle an eventual failure.

Some embodiments of the present invention may include one, or more, of the following features, characteristics and/or advantages: (i) analyze the physical hardware such as a server's age, BIOS, firmware version, general hardware failure like disk drives, power supply, the HA/DR policies set on the environment being analyzed etc.; (ii) factor in any redundancy in the setup (for HA/DR) which would improve the resiliency score; (iii) consider the physical servers and its components as well as the virtual servers running on the physical hosts; (iv) for example, even if the physical host is quite aged, if the virtual server running on it has an equivalent active/passive counterpart to it, which can be used during a failure, it improves the resiliency score; (v) using managed services like monitoring, backup etc. as actions from the failure analysis it does; (vi) replacing servers (and/or server hardware) proactively based on the failure analysis, whereas resiliency score based actions in our disclosure handles it; (vii) comparing between different environments for resiliency; and/or (viii) for example, if there are two cloud providers then they can be compared with respect to their resiliency score and one of the cloud providers may use that as part of their marketing to showcase how they can better withstand failures.

Some embodiments of the present invention may include one, or more, of the following features, characteristics and/or advantages: (i) gather and analyze various data points in a cloud environment to compute a resiliency score and takes actions (for example, from increasing frequency of managed services like patching, monitoring etc. to recommend to order new hardware) based on that score for improving resiliency on the cloud; (ii) consider geographic or weather conditions that can affect the hardware and hence virtual machines running on the hardware; (iii) using managed services like backup, monitoring etc. to reduce the effect of the issues found and using a resiliency score based on various factors like hardware age, hypervisor, bios/firmware version etc. to determine a course of action; (iv) considering the approval ratings of third party service providers (for example, an electricity provider for the datacenter) while computing the reliability level; and/or (v) analyzing HA/DR policies.

Some embodiments of the present invention may include one, or more, of the following features, characteristics and/or advantages: (i) calculating a resiliency score based on the physical hardware like server's age, BIOS, firmware version, general hardware failure like disk drives, power supply etc.; (ii) setting the HA/DR policies based on the environment being analyzed etc.; (iii) gather and analyze the various data points in a cloud environment to compute a resiliency score and taking actions (for example, increasing managed services like patching, monitoring etc. and/or ordering new hardware) based on that score for improving resiliency on the cloud; (iv) the Resilience Service Manager can drive parallel efficiencies, by pushing "data gathering" to multiple sites in parallel; (v) this parallel data gathering coordinated from the central Resiliency Service Manager and run at multiple sites by the Resilience Site Service aids in the following manner: (a) when sites are dynamically added or removed (or even infrastructure on a site gets updated or goes down for maintenance), continuous monitoring of the resiliency score enables the resilience service manager to determine which environment has the best resiliency score (and hence likely the most popular to run the service on); (b) computations of the resiliency score involves various parameters; (c) these factors multiplied by the number of sites a cloud provider has and the number of cloud providers involved; and (d) it is quite important to get this data in real time, the parallel computation of resiliency score for each environment is a significant advantage; (vi) assessing hardware failure risk for data storage elements and multiple other hardware devices, such as physical servers, disk drives, power supply etc.; and/or (vii) analyze the physical hardware like server's age, BIOS, firmware version, general hardware failure like disk drives, power supply, the HA/DR policies, weather/geographic factors for the environment being analyzed etc.

Some embodiments of the present invention may include one, or more, of the following features, characteristics and/or advantages: (i) using managed services like monitoring, backup etc. as actions from the failure analysis it does; (ii) an apparatus that gathers and analyses the various data points in a cloud environment to compute a resiliency score and takes actions; (iii) integrate the resiliency attributes to the triggering of managed services; (iv) the resiliency score can trigger various managed service actions like increasing backup frequency; (v) examining the state of the environment as it is now (not based on resiliency requirement to be met for a certain application like business support process or customer process to run on it) and generates a score based on which certain actions like triggering of managed services can be done; (vi) this improves the resiliency of the environment without having to add additional subsystems/servers etc. to handle potential points of failure; and/or (vii) a layered approach of Central/Site resiliency managers.

Above, in the Background section, certain prior art was mentioned where a reliability value was computed and used. This is not the same as a resiliency score according to various embodiments of the present invention. According to some embodiments of the present invention, reliability differs from resiliency in that a determined reliability value includes information indicative of how likely (or unlikely) a component of a system is to suffer a failure given a set of operating parameters. For example, a given memory component might be expected to operate up to 100,000 write/erase cycles, where each cycle includes writing data to the memory and then erasing that data. After 100,000 such cycles, the expected reliability of the memory component is significantly lower than prior to reaching that rating. Resiliency, according to some embodiments of the present invention, is an indication of how functional a given system is after suffering such a failure. For example, if a given computer device system has two parallel power supplies, each capable of supplying 100% of the power requirements for the system, then that system has increased resiliency over a near-identical system with only one power supply. The increased resiliency in this example is a result of the system being capable of carrying on complete functionality despite the failure of one power supply.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving a time-date data set including information indicative of the time and date at which certain computer operations were performed in a set of server computer(s) and when computer components were installed in the set of server computer(s);
receiving a machine logic based rules data set including a plurality of machine logic based rules, where the machine logic based rules include rules for assigning scores to the certain computer operations and computer components based on their corresponding time and dates;
determining a resiliency value of the set of server computer(s) based upon an application of the plurality of machine logic based rules to the time-date data set, with the resiliency value corresponding to an indication of future performance of the set of server computer(s) when some of the hardware, firmware and/or software of at least some server computers of the set of server computer(s) fails, where the resiliency value results from aggregating assigned scores from the certain computer operations and computer components;
determining a recommended change to the hardware, firmware and/or software of the set of server computers based, at least in part, upon the resiliency value; and
making the recommended change to the set of server computer(s).

2. The method of claim 1 wherein the time date data set includes at least one of the following types of time-date information: (i) time and date when a virtual machine, running on the set of server computer(s), was instantiated from a virtual machine image; (ii) time and date when a hypervisor was installed on a server computer of the set of computer server(s); (iii) time and date when a basic input/output system was installed on a server computer of the set of the set of server computer(s); (iv) time and date when an operating system was installed on a server computer of the set of server computer(s); (v) time and date when a firmware upgrade was made on a server computer of the set of server computer(s); and (vi) time and date when a physical driver was installed on a server computer of the set of server computer(s).

3. The method of claim 1 wherein the recommended change is installation, on at least one server computer of the set of server computer(s), one of the following types of software: operating system, kernel, basic input/output system (BIOS), application that interacts with human users, application that manages use of computer resource(s), hypervisor, emulation software, virtual machine, and changes to a plurality of software configurations for the at least one server computer.

4. The method of claim 1 wherein the recommended change is addition, to the set of server computer(s), one of the following types of hardware: a server, a storage device, a cooling device, a processor, a memory, and network communications related hardware.

5. The method of claim 1 wherein the recommended change is installation, on at least one server computer of the set of server computer(s), one of the following types of firmware: operating system, kernel, basic input/output system (BIOS), application that interacts with human users, application that manages use of computer resource(s), hypervisor, emulation software, virtual machine, firmware for a component of the at least one server computer, and changes to a plurality of firmware configurations for the at least one server computer.

6. The method of claim 1 wherein the determination of the resiliency value is based, at least in part, upon the existence and/or details of a high availability policy.

7. The method of claim 1 wherein the determination of the resiliency value is based, at least in part, upon the existence and/or details of a disaster recovery plan.

8. The method of claim 1, wherein the machine logic based rules include assigning weighted values to a plurality of data elements of the time-date data set.

9. The method of claim 1, wherein:
the recommended change is determined from a plurality of recommended changes with corresponding resiliency value thresholds, where each recommended change corresponds to a resiliency value threshold; and
determining the recommended change is based on comparing the resiliency value of the set of server computer(s) to the plurality of thresholds to determine which recommended change corresponds to the greatest resiliency value threshold exceeded by the resiliency value of the set of server computer(s).

10. A computer-implemented method comprising:
receiving a time-date data set including information indicative of the time and date at which certain computer operations were performed in a set of server computer(s);
receiving a machine logic based rules data set including a plurality of machine logic based rules, where the machine logic based rules include rules for assigning scores to the certain computer operations and computer components based on their corresponding time and dates;
determining a resiliency value of the set of server computer(s) based upon an application of the plurality of machine logic based rules to the time-date data set, with the resiliency value corresponding to an indication of future performance of the set of server computer(s) when some of the hardware, firmware and/or software of at least some server computers of the set of server computer(s) fails, where the resiliency value results from aggregating assigned scores from the certain computer operations and computer components;
determining a recommended change to a disaster recovery plan for the set of server computer(s) based, at least in part, upon the resiliency value; and
making the recommended disaster recovery plan change to the set of server computer(s).

11. The method of claim 10 wherein the change to the disaster recovery plan includes at least one of the following types of changes: (i) increasing a frequency of complete backups for the set of server computer(s), (ii) increasing the number of remote geos where remote backup server computer(s) are located, and (iii) increasing the percentage of normal operations capability of the remote backup server computer(s).

12. The method of claim 10, wherein the machine logic based rules include assigning weighted values to a plurality of data elements of the time-date data set.

13. The method of claim 10, wherein:
the recommended change is determined from a plurality of recommended changes with corresponding resiliency value thresholds, where each recommended change corresponds to a resiliency value threshold; and
determining the recommended change is based on comparing the resiliency value of the set of server computer(s) to the plurality of thresholds to determine which recommended change corresponds to the greatest resiliency value threshold exceeded by the resiliency value of the set of server computer(s).

14. The method of claim 10 wherein making the recommended change occurs without substantial human intervention.

15. A computer-implemented method comprising:
receiving a time-date data set including information indicative of the time and date at which certain computer operations were performed in a set of server computer(s);
receiving a machine logic based rules data set including a plurality of machine logic based rules, where the machine logic based rules include rules for assigning scores to the certain computer operations and computer components based on their corresponding time and dates;
determining a resiliency value of the set of server computer(s) based upon an application of the plurality of machine logic based rules to the time-date data set, with the resiliency value corresponding to an indication of future performance of the set of server computer(s) when some of the hardware, firmware and/or software of at least some server computers of the set of server computer(s) fails, where the resiliency value results from aggregating assigned scores from the certain computer operations and computer components;
determining a recommended change to a high availability policy (HAP) for the set of server computer(s) based, at least in part, upon the resiliency value; and
making the recommended HAP change to the set of server computer(s).

16. The method of claim 15 wherein the change to the high availability policy includes at least one of the following types of changes: (i) increasing active monitoring frequency, (ii) lowering active monitoring thresholds, (iii) increasing the redundancy of hardware components, and (iv) increasing the throughput capability of the server computer such that a partial loss of throughput capability has minimal or no impact on the required throughput for normal operations.

17. The method of claim 15, wherein the machine logic based rules include assigning weighted values to a plurality of data elements of the time-date data set.

18. The method of claim 15, wherein:
the recommended change is determined from a plurality of recommended changes with corresponding resiliency value thresholds, where each recommended change corresponds to a resiliency value threshold; and
determining the recommended change is based on comparing the resiliency value of the set of server computer(s) to the plurality of thresholds to determine which recommended change corresponds to the greatest resiliency value threshold exceeded by the resiliency value of the set of server computer(s).

19. The method of claim 15 wherein making the recommended change occurs without substantial human intervention.

* * * * *